(12) United States Patent
Shafer

(10) Patent No.: US 6,272,903 B1
(45) Date of Patent: Aug. 14, 2001

(54) PIPELINE VALVE LEAK INDICATOR

(76) Inventor: Jon Lawrence Shafer, #1802, 14655 Champion Forest Dr., Houston, TX (US) 77069

( * ) Notice: Subject to any disclaimer, the term of this patent is extended or adjusted under 35 U.S.C. 154(b) by 0 days.

(21) Appl. No.: 09/511,180

(22) Filed: Feb. 22, 2000

(51) Int. Cl.$^7$ .................................................. G01M 3/08
(52) U.S. Cl. ............................................................ 73/46
(58) Field of Search ............................... 73/46, 40, 49.5; 200/61.04; 340/605

(56) References Cited

U.S. PATENT DOCUMENTS

| | | |
|---|---|---|
| 2,601,840 | 7/1952 | Smith et al. . |
| 3,398,761 | 8/1968 | Grove et al. . |
| 3,610,025 | 10/1971 | Brunner . |
| 4,380,325 | 4/1983 | Palmer ................................... 251/14 |
| 4,414,441 * | 11/1983 | Perry et al. ........................ 200/61.04 |
| 4,590,462 * | 5/1986 | Moorehead .......................... 340/605 |
| 4,685,327 | 8/1987 | Sharp .................................... 73/49.2 |
| 4,787,772 | 11/1988 | Wagner ................................... 405/53 |
| 4,847,599 | 7/1989 | Imiolex et al. ...................... 340/605 |
| 4,870,856 | 10/1989 | Sharp ..................................... 73/40.5 |
| 4,901,751 | 2/1990 | Story et al. ........................... 137/312 |
| 5,058,421 | 10/1991 | Alexander et al. ................... 73/49.2 |
| 5,146,778 | 9/1992 | Hsu ...................................... 73/61.41 |
| 5,421,193 | 6/1995 | Carlin et al. ......................... 73/49.2 |
| 5,656,766 | 8/1997 | Horn et al. ............................ 73/49.2 |

FOREIGN PATENT DOCUMENTS

| | | | |
|---|---|---|---|
| 401023981A * | 1/1989 | (JP) ............................... B65D/90/50 |
| 777530B * | 11/1980 | (SU) ............................... G01M/3/18 |

OTHER PUBLICATIONS

"Installation, Operation & Maintenance of W–K–M Through–Conduit USAS Gate Valves," WKM Valve Division, ACF Industries, Inc., 1968.

"W–K–M Valves Wellhead Equipment Safely Systems" WKM, ACF Industries, Inc., 1980, pp. cover page, 7346, 7349, 7353, 7368, 7369, 7378, 7406–7413.

* cited by examiner

Primary Examiner—Hezron Williams
Assistant Examiner—Jay L. Politzer
(74) Attorney, Agent, or Firm—Guy McClung

(57) ABSTRACT

A leak indicating system for a pipeline valve, the valve for selectively controlling the flow of oil through the pipeline, the leak indicating system including a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can. The system further includes a can top releasably secured over the open top end of the hollow can, the can top having a hole therethrough, the lid mounted above the can top, and the spring extendable through the hole in the can top. The system wherein the lid has at least one surface with visually sightable indicia thereon.

20 Claims, 6 Drawing Sheets

PIPELINE VALVE LEAK INDICATOR

BACKGROUND OF THE INVENTION

1. Field of the Invention

This invention is related to leak indicators for pipeline valves and, in certain particular aspects, to such indicators that are easily seen visually especially by a person in a low altitude plane flying over a pipeline.

2. Description of Related Art

Cross country pipelines have flow control valves located periodically (e.g. every ten to fifteen miles) along the pipeline's length. The great majority of these valves are in remote locations where no electrical power is available. Many of these valves are subjected to extremes of heat, cold, snow, ice, and wind. Typically pipeline valves are checked for leakage by flying the pipeline and visually inspecting the valves from the air. There have been many prior art attempts to provide leak indicators to facilitate the detection of fluid leaks.

U.S. Pat. No. 5,656,766 discloses a leak detector for an underground drain tank. A flag is raised above ground to indicate a leak in the tank, but a considerable, and perhaps environmentally injurious, amount of leakage must occur to activate the leak detector. U.S. Pat. No. 4,787,772 discloses relatively complex tank leak detection system that has an auxiliary tank that collects fluid leaking from a main tank and a pump system for pumping the leaked fluid from the auxiliary tank to a surface tank for inspection. Another tank leak detection system as disclosed in U.S. Pat. No. 4,685,327 monitors a closed inner space between an outer jacket and a gasoline tank's exterior. The leak detector is in communication with the closed space to monitor for leakage through either the storage tank or jacket. Several different types of detectors are used, including liquid level detectors, pressure change detectors, gas or liquid analyzers, and electronic probes. The detector itself may be positioned within the sleeve for ready accessibility. The detector can be periodically checked or it can be electronically connected to a remote receiving station for continuous monitoring. In one aspect the detector has a detecting liquid which completely fills the closed space and extends into a standpipe and a sight glass associated with the standpipe allows for easy observation of the liquid. A leak in the inner tank causes a migration of detecting liquid into the tank or, less likely, gasoline into the closed space. A loss of liquid into the tank results in a drop of the level of liquid in the standpipe. Migration of gasoline into the closed space is also detected by observation. The detecting liquid can be dyed a contrasting color for easier observation.

U.S. Pat. No. 5,146,778 discloses apparatus for the detection of oil or water leakages having a housing with a plurality of openings. The housing has a sufficient volume to permit the expansion of an absorbent material placed within it. Additionally, the housing has a hollow rod extending from it. Running through the rod is a wire. One end of the wire extends into the housing and holds a weighted member. The other end of the wire is connected to a signalling device for signalling persons of the presence of the liquid sought to be detected. When an expandable absorbent material is placed in the housing and the material detects the presence of a particular liquid, the absorbent material expands. This expansion forces the weighted member to push the wire through the hollow rod so that the signalling device is activated. Underground leakages in oil and/or water tanks may also be detected and signalled to persons in the area. In one aspect the system has two parts that separate causing a hidden section, originally within the container, to be revealed. The hidden section may be vividly colored for easy and quick visual recognition by persons in the area. In one aspect, the hidden portion is an inner portion of the container and an upper part of the container, and a signal is revealed as the upper separating part of the container. Alternatively the container may be constructed so that the perforated inner section of the container rests on a surface, and the bottom part of the container is capable of serving as the visual signal.

U.S. Pat. No. 5,421,193 discloses a leak detector including a float having a number of magnets connected to the float. Electromagnetic coils are disposed along a length of the possible range of travel of the float within the leak detector. The coils, when energized, interact with the magnet making the float move-about and settle to a position representing its true equilibrium buoyancy. Optionally, the leak detector includes a self-calibration apparatus that provides a reference signal indicating the fixed position of the self-calibration apparatus, allowing the leak detector to compensate for offset errors.

U.S. Pat. No. 4,847,599 discloses a fluid leak detector has a body with a chamber provided with a fluid inlet and outlet. A valve is disposed between the inlet and outlet and the valve closure member is connected to a diaphragm. Fluid in the chamber applies pressure on the diaphragm and the detector includes means which allow the valve to be open at a pressure greater than a predetermined value and cause the valve to close at pressures below that value, which may be due to a fluid leak. The detector has a safety lock-off mechanism which locks the valve once it has closed and which must be reset to allow the valve to open when fluid pressure has been restored. The detector also provides a visual indication (e.g. a two-position handle) of fluid leaks. A fluid supply installation incorporating the fluid leak detector will shut down the fluid supply if a leak is detected.

U.S. Pat. No. 4,901,751 discloses a fluid control valve with leak detection and containment features for use in a fluid handling system incorporating one or more flow controlling devices each including: an actuator; a weir valve and associated valve housing; and a pair of spaced apart diaphragms, one of which serves as the closure member for the weir valve and the other providing a secondary seal defining the limits of a containment chamber for at once preventing contamination of the controlled fluid, protecting the actuating mechanism and allowing immediate detection of valve closure failure. A piston member disposed within the chamber is coupled to the two diaphragms, and a fluid detection device is disposed in communication with a sealed containment chamber formed between the two diaphragms. The system includes electronic control apparatus responsive to the detection device and is operative to instantaneously shut down the system in the event of a detected failures.

U.S. Pat. No. 3,398,761 discloses a valve leak detection system for a valve apparatus with a valve body having inlet and outlet openings adapted to be connected to associated piping, a valve member disposed within the body and movable between open and closed valving positions with respect to said openings, sealing apparatus or device generally surrounding each of said openings, there being a closed body space within the valve body surrounding the valve member, vent valve apparatus exterior of the body and in communication with the body space, the vent valve apparatus operable to vent the body space to the atmosphere, and indicator apparatus for indicating leakage into the body space past one of the seals. In one aspect the indicator apparatus is an electrical indicator at the remote station, a pressure operated switch located near the valve, the pressure operated switch having a fluid pressure connection with the space within the valve body, and electrical circuitry connecting the electrical switch wit the indicator at the remote station and also with a visual indicator.

U.S. Pat. Nos. 2,601,840 and 2,708,896 disclose leak indicating protective covers for pipe flanges and valves, the covers including material that changes color upon contact by leaking fluid.

There has long been a need, recognized by the present inventor, for a quick-response reliable leak indicator for pipeline valves, e.g. due to elastomer valve stem packing seal failure. There has long been a need for such an indicator, recognized by the present inventor, which is easily visible, particular by a person in a low flying plane over a pipeline. There has long been a need, recognized by the present inventor, for such an indicator that will also collect leaked fluid and prevent it from contaminating the environment adjacent the valve and the pipeline. There has long been a need, recognized by the present inventor, for such an indicator that is weatherproof and/or bulletproof.

SUMMARY OF THE PRESENT INVENTION

The present invention discloses, in certain embodiments, a leak detection system for a valve that controls fluid flow in a pipeline. The system has, in certain aspects, a hollow can with a fluid flow line in fluid communication with an area around the valve, e.g. in fluid communication with a stem packing area around a valve stem. The can has a spring-loaded rod or piston therein that is prevented from moving upwardly within the can by an oil-dissolvable member near the bottom of the can that holds the spring in compression. A top end of the rod or piston projects through a can top and has a secondary lid mounted thereon. The secondary lid covers the can top. The secondary lid is a different color than a color of the can top.

Upon dissolution of the oil-dissolvable member, the spring is released and moves upwardly with sufficient force to launch the secondary lid away from the can, exposing the can top. Since the can top is a specific color, different from the color of the secondary lid, visual sighting of the color of the can top indicates that a leak has occurred. In another aspect the secondary lid top and the can top are the same or similar and by visual sighting it is determined that the secondary lid has been moved from the can, indicating a leak. In one aspect the secondary lid is black or green and the can top is yellow or orange. Alternatively, or in addition to the differences in color, different designs and/or different indicia (e.g. letters, numbers, symbols) may be used on the can top and the secondary lid. Either or both top and bottom surfaces of the secondary lid and/or of the can top may have the indicia thereon. In certain aspects, the indicia include fluorescent or luminous material easily seen in the dark.

In certain aspects the lid is one shape, e.g. square, as viewed from above and the can top is another shape, e.g. circular, as viewed from above, either lid or top with or without other indicia. In one aspect the indicia includes a mirror or a mirror surface on the lid, on the can top, or both—and, in certain aspects, both a top and a bottom surface of the lid and/or the can top includes such a mirror or a mirror surface. In other aspects, ground around the system is colored the same as the lid to enhance the contrast of the can top (of a different color) with the color of the lid and ground.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

A new, useful, unique, efficient, nonobvious leak detection system;

Such a system useful for indicating a leaking valve, a leaking pipe or conduit, and a leaking pipeline valve;

Such a system that provides an easily identifiable visual indication of a leak and, in one aspect, such an indication for a person in a plane above a pipeline;

Such a system which collects leaking fluid;

Such a system which provides a relatively quick response to a relatively small amount of leaked fluid;

Such a system which does not require power, e.g. electric, pneumatic, or hydraulic power;

Such a system that is weatherproof and/or bulletproof; and

Methods for using such systems.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
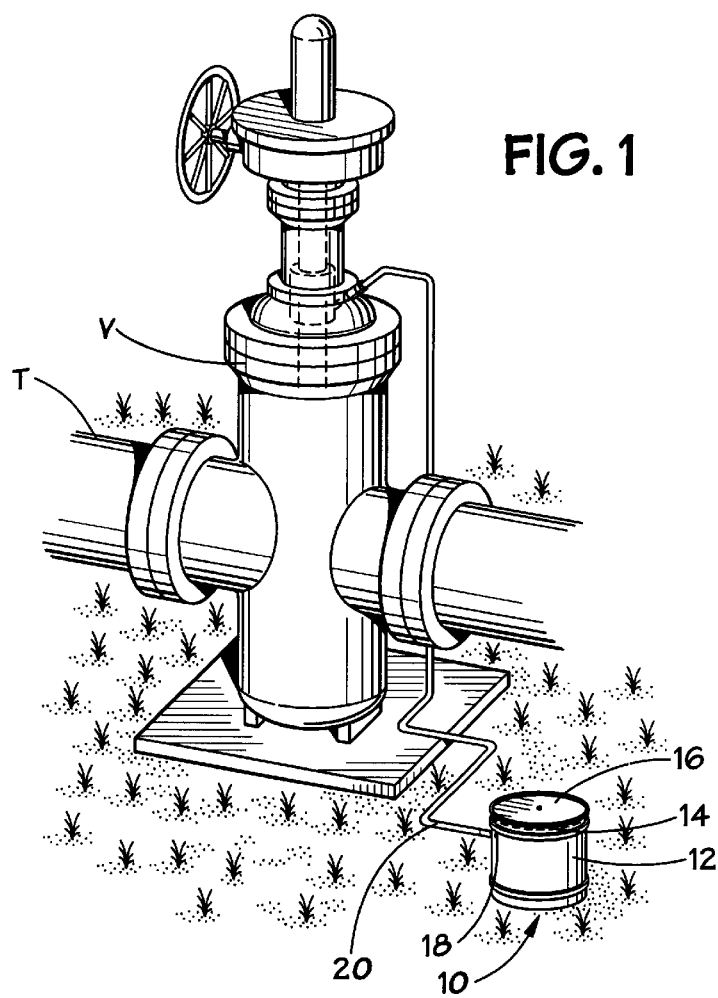
FIG. 1 is a perspective schematic view of a leak detection system according to the present invention.

FIG. 1 shows a leak detection system 10 according to the present invention with a hollow can 12 having a top 14 and a secondary lid 16. A hole 18 provides an inlet for a hose or tube 20 that is in fluid communication with a potential fluid leakage site or area, e.g., but not limited to, the valve packing area around a stem of a pipeline valve V on a pipeline T. The can 12 may be any suitable size and may contain any suitable volume. In one particular embodiment the can is cylindrical, about 13¾ inches in diameter and about 13⅞ inches tall.

Figure 2:
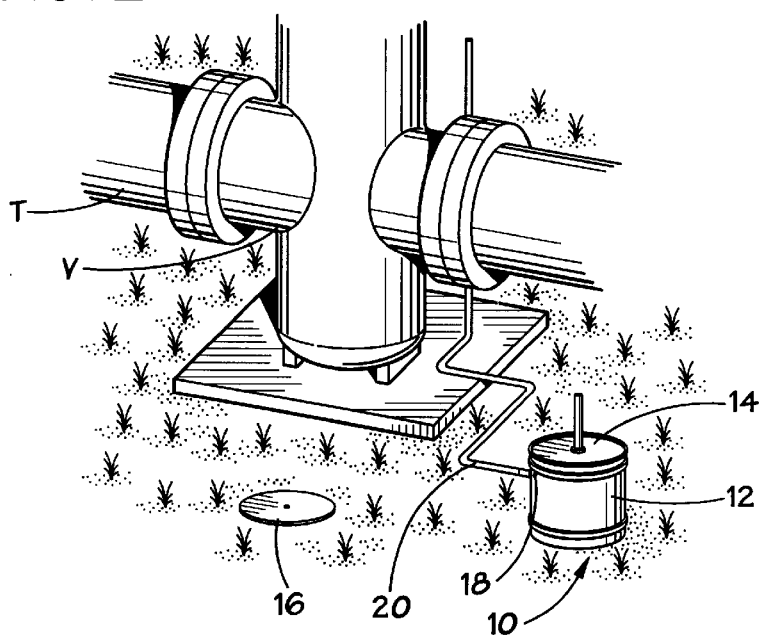
FIG. 2 shows the system of FIG. 1 following the launch of a secondary lid.

As shown in FIG. 2, the secondary lid 16 has been launched away from the top 14 upon dissolution of an oil dissolvable member as described in detail below.

The spring 24 has a top 36 which encircles a shaft 37, a top member 38 and a bottom end 42 that encircles a shaft 43 of a bottom member 44 within the hollow rod 26. A ring 43 is positioned within a top end of the rod 26 and is sized to prevent the top member 38 from exiting from within the rod. A lower end 46 of the bottom member 44 abuts the dissolvable member 22 and is forced against it by the spring 24.

The dissolvable member 22 is sized so that, upon its dissolution, the spring 24 has sufficient freedom of movement to decompress and force the secondary top 16 away from the can 12, exposing the can top 14.

A threaded upper collar 40 threadedly engages with threads 48 of the tube guide 28 to hold the can top 14 to the tube guide 28. A washer 49 is disposed between a bottom surface of the can top 14 and an upper edge of the tube guide 28. A bolt 27 secures a member 29 to the lid 16. The member 29 rests in a channel 23 that extends through the collar 40. A lower threaded collar 50 threadedly engages threads 25 of the hollow rod 24 and the dissolvable member 22 is positioned within the lower end of the bottom collar 50.

Fluid, e.g. oil, leaking from an apparatus (e.g. like the valve V, FIG. 1) flows through holes 52 at the end of the tube guide 28, then through holes 54 in the lower collar 50 to contact and dissolve the dissolvable member 22. The member 22 rests on an interior shoulder 59 of the collar 50.

A releasable lock band 32 releasably holds the can top 14 to the can 12.

Figure 6:
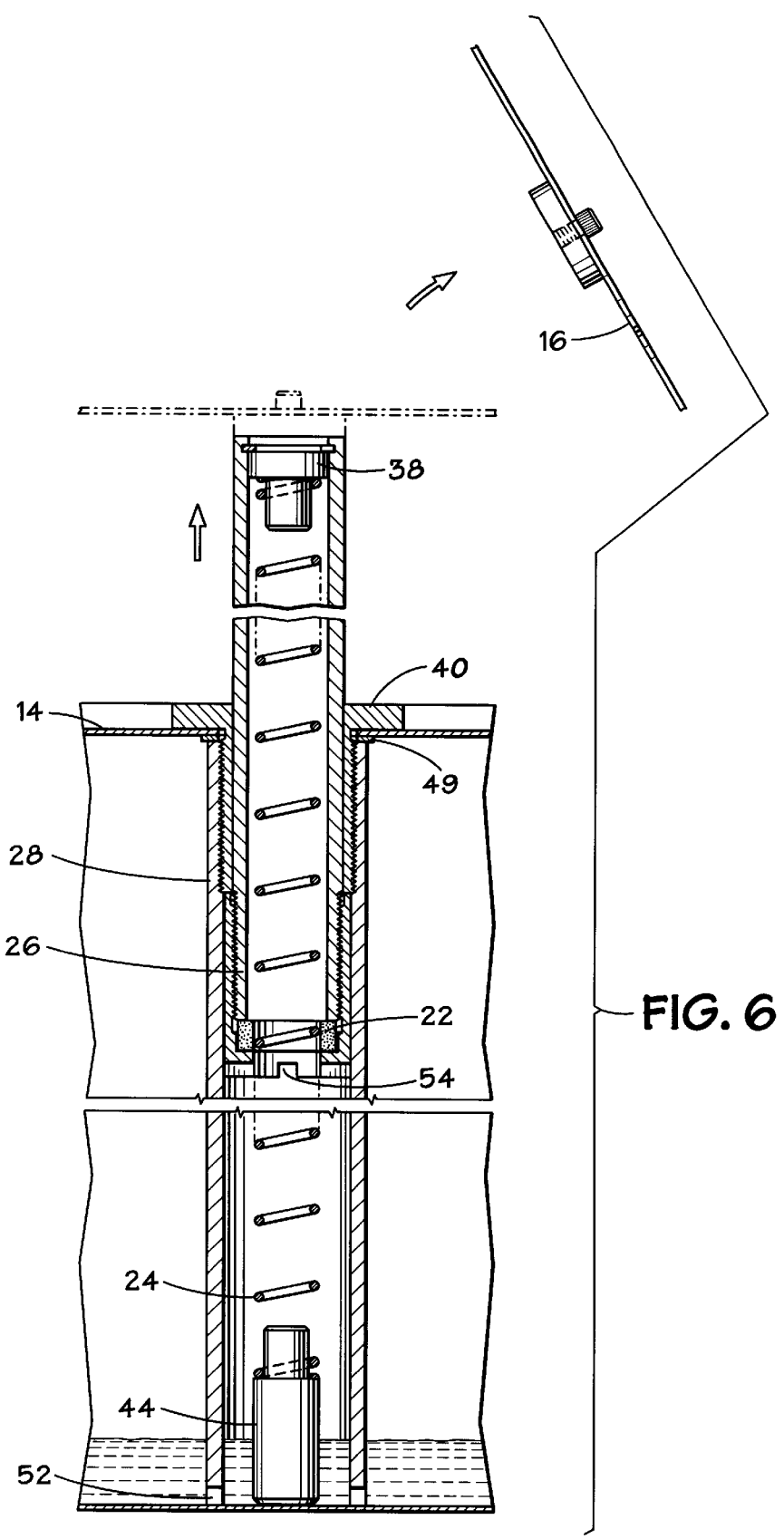

FIG. 6 illustrates launching of the secondary lid 16 away from the can 12 following dissolution of the dissolvable member 22 and decompressing of the spring 24, thereby exposing the can top 14 for visual sighting.

Figure 7:
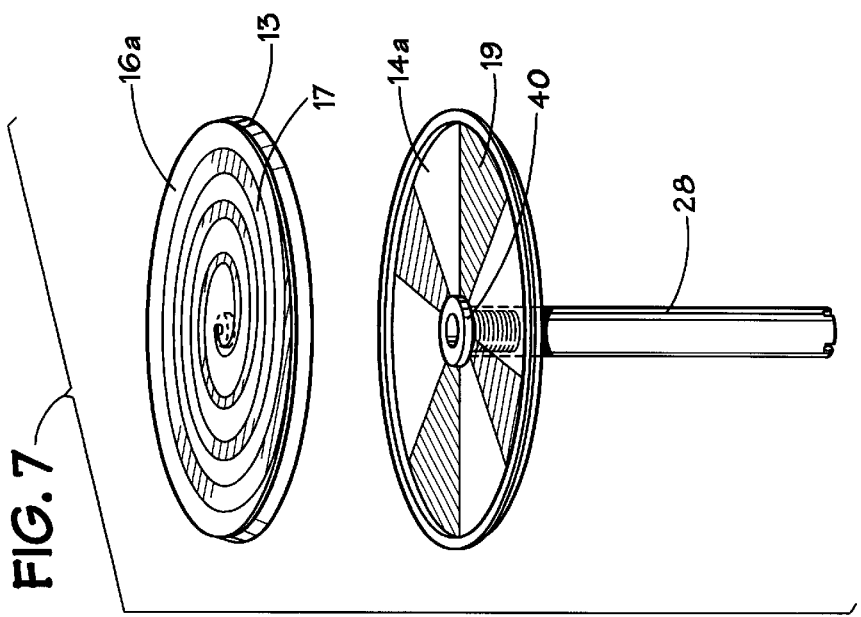
FIG. 7 is a perspective view of part of a system according to the present invention.

FIG. 7 shows an alternative secondary lid 16a with a spiral design 17 on its top and an alternative can top 14a with a cross design 19 on its top. Any visually sightable designs may be used on the lid and can top and/or any other noticeable colors, numbers, indicias, signs, and/or symbols.

An optional lip or skirt 13 extends down from the lid 16a and inhibits the entry of rain, debris, etc. between the lid and the can top. Any suitable seal or gasket material may be used on the lid 16a and/or on the can top 14a to enhance the seal emplacement of the lid on the can top. Alternatively (for any embodiment of the present invention), the can top is deleted and the lid is sealingly emplaced over the open top end of the can.

Figure 3:
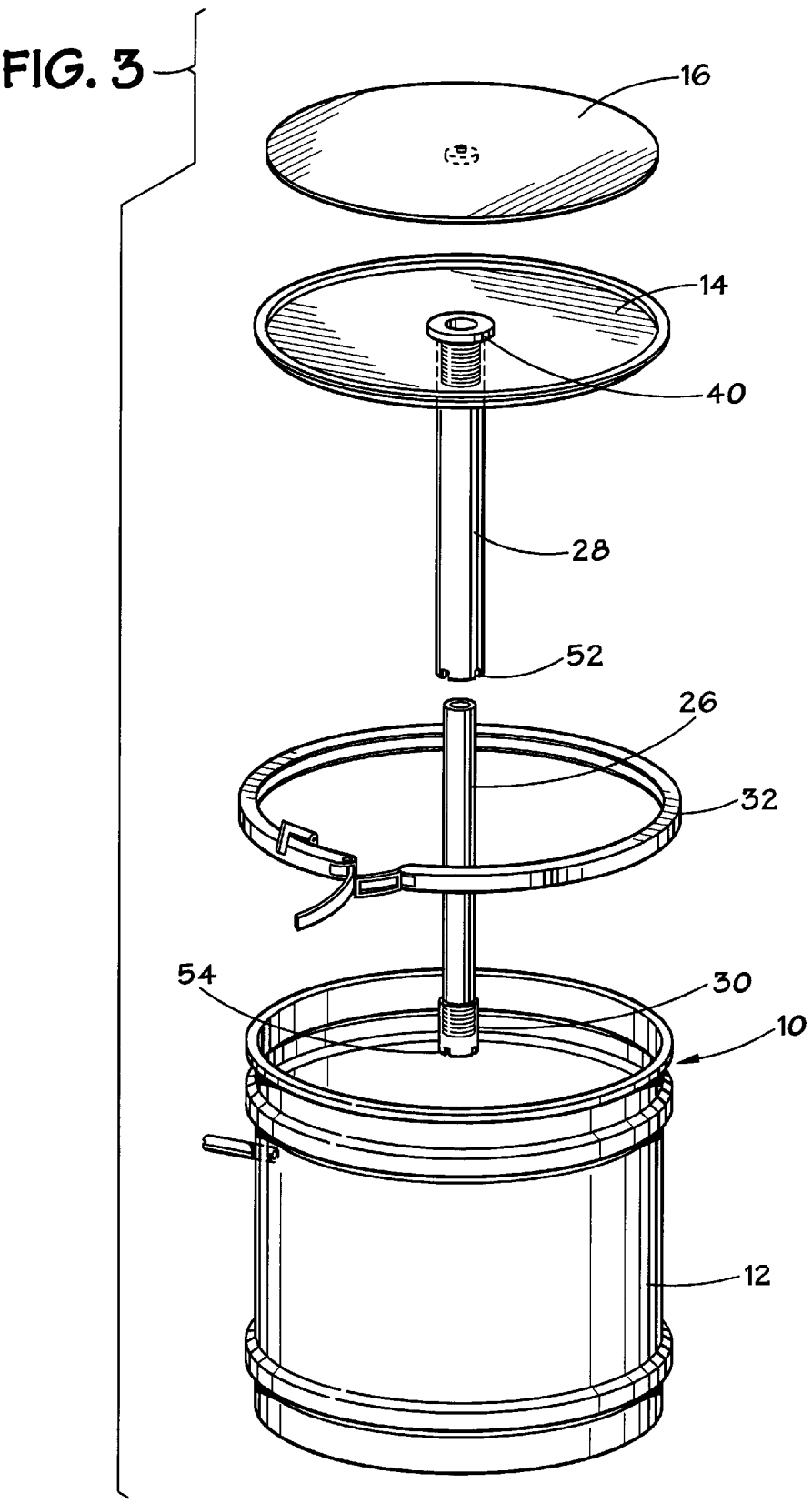
FIG. 3 is an exploded perspective view of a leak detection system according to the present invention.
Figure 4:
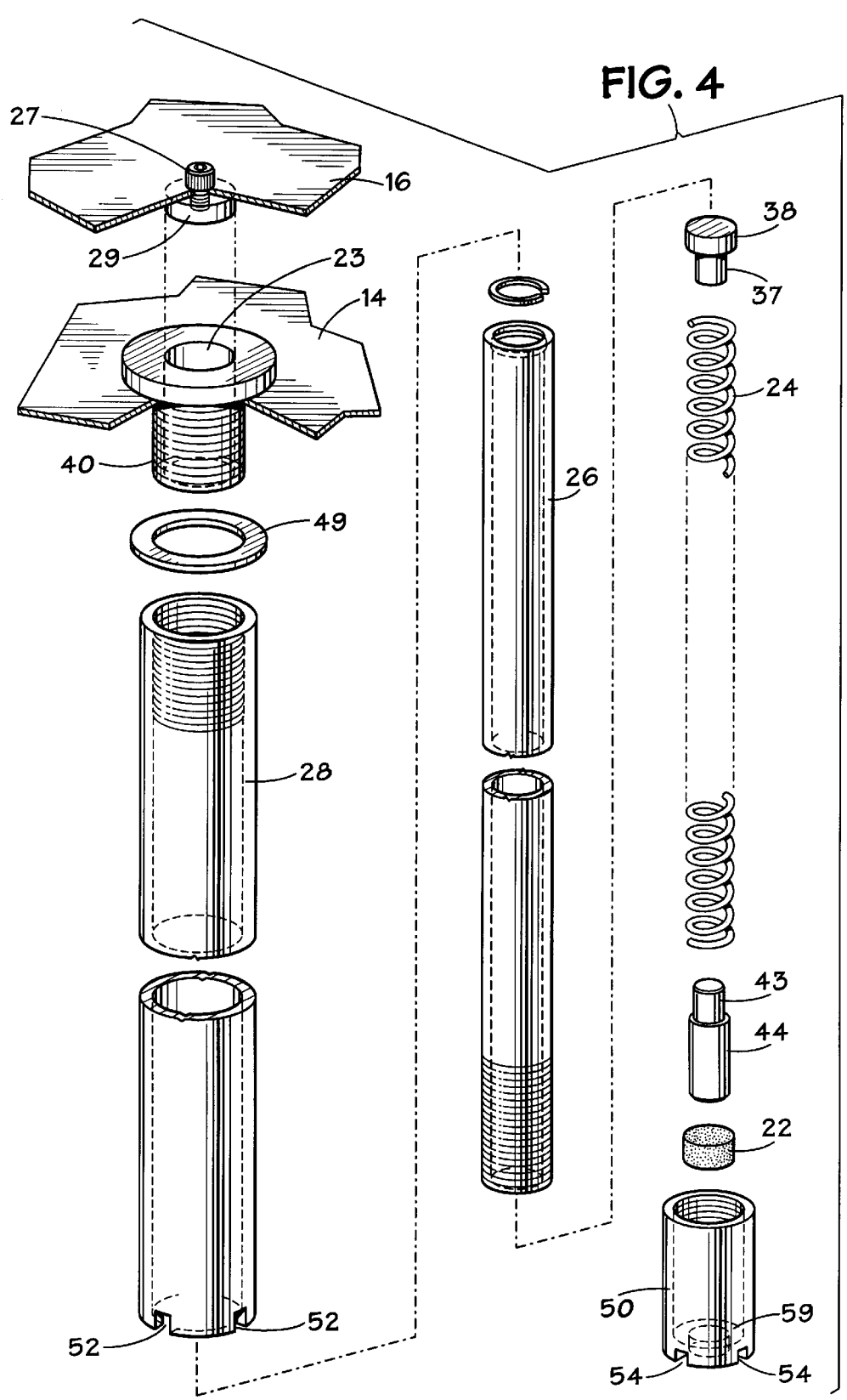
FIG. 4 shows an enlargement of certain parts of the system of FIG. 3.
Figure 5:
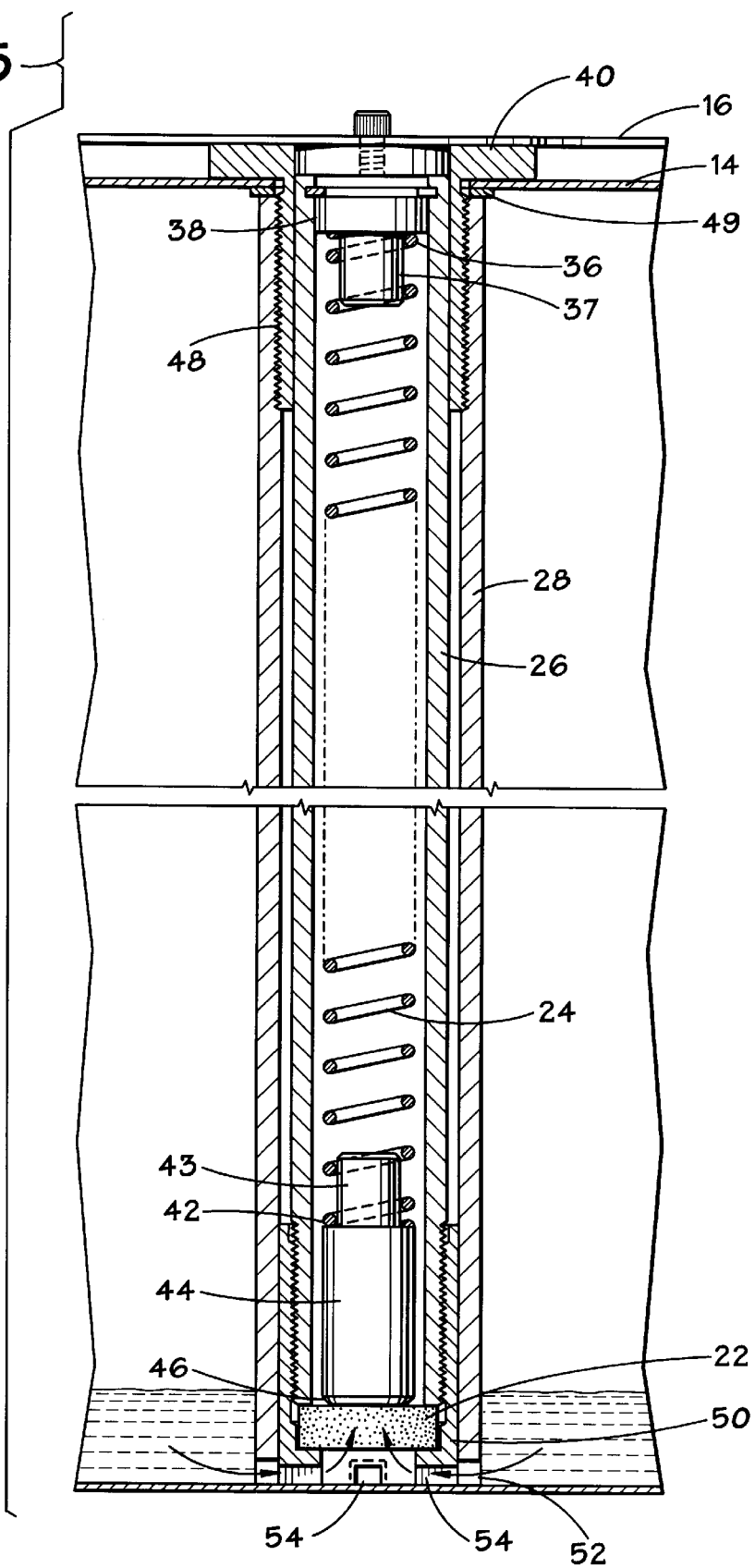
FIGS. 5 and 6 are side cross section views of the system of FIG. 3.
Figure 8:
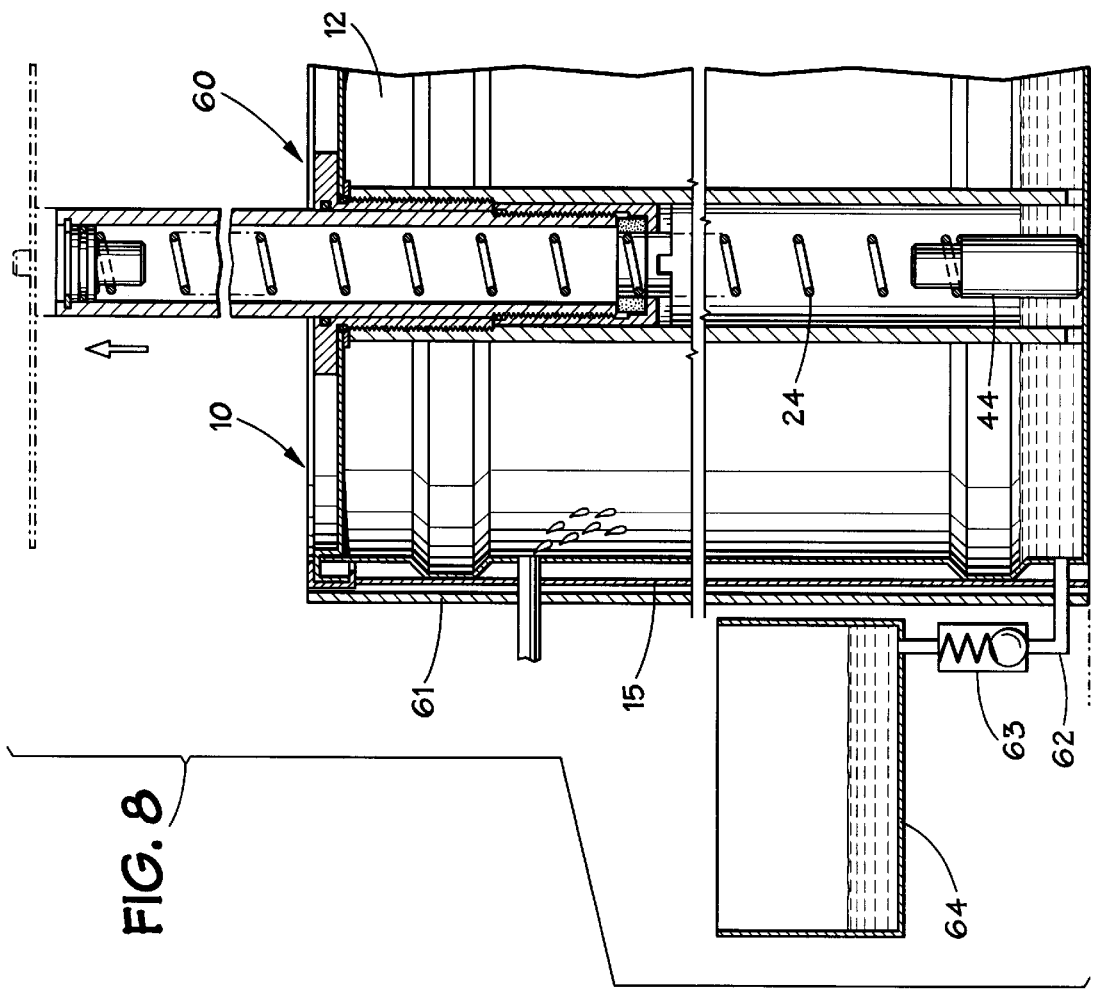
FIG. 8 is a side cross-section view of a system according to the present invention.

As shown in FIG. 8 a system 60 according to the present invention includes a system 10 (as in FIG. 3) in fluid communication with a potential leak site (e.g. a valve stem packing of a pipeline valve) via a conduit 62. Via a conduit 62 a collection pan 64 is in fluid communication with the interior of the can 12. A relief valve 63 opens in response to the pressure of leaked fluid in the can 12 and leaking fluid flows into the pan 64. The pan 64 may be any desired volume. Thus fluid that flows into the pan 64 does not flow onto the ground around the can 12. As shown in FIG. 8 an additional armor layer 15 may be used around the can 12 to prevent damage to the system 10 by bullets. Only one cross-section of the layer 15 is shown, but it is to be understood as encircling and enclosing the can 12. Alternatively, or in addition to the layer 15, the system 10 can, optionally, be set down in a piece of hollow pipe 61 and/or can be surrounded by a wall of concrete, bricks, etc.

In certain preferred embodiments secondary lids for cans according to the present invention are made of aluminum or steel about 0.0625 inches thick; the cans are made of 16 gauge steel or aluminum; the rods or pistons are made of aluminum or steel about 0.1875 inches thick; the tube guides are made of aluminum or steel about 0.1875 inches thick; and the cans hold about 12.5 gallons. In certain aspects the cans are sufficiently thick to be bulletproof.

The present invention, therefore, in at least certain embodiments, but not necessarily all of them, provides a system for indicating a leak of oil from an apparatus, the system including a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can. Such a system may have one or some (in any possible combination) of the following: a can top releasably secured over the open top end of the hollow can, the can top having a hole therethrough, the lid mounted above the can top, and the spring extendable through the hole in the can top; a hollow rod encircling the spring and abutting a lower surface of the lid, and the oil dissolvable member mounted in the hollow rod and holding the spring in compression; a guide tube secured to the can top and encompassing the hollow rod, the hollow rod movable by the spring upwardly within the guide tube against the lid as the lid is launched; a bottom member within the hollow rod having an upwardly projecting shaft encircled by a lower end of the spring, the bottom member abutting the oil dissolvable member, and the oil dissolvable member positioned within the hollow rod beneath the bottom member; wherein there is at least one opening through the hollow rod whereby the interior of the hollow rod is in fluid communication with the interior of the hollow can so that oil flowing into the can is flowable to contact the oil dissolvable member; wherein there is at least one opening through the guide tube whereby the interior of the guide tube is in fluid communication with the interior of the hollow can so that oil flowing into the can is flowable through the at least one opening of the guide tube to the at least one opening of the hollow rod; a collection pan in fluid communication with the can interior for receiving oil from the can interior; a check valve in a conduit providing the fluid communication between the hollow can and the collection pan, the check valve openable in response to a desired pressure of oil within the hollow can; wherein the lid has at least one surface with visually sightable indicia thereon; wherein the at least one surface is a top surface and a bottom surface, each with the indicia thereon; wherein the visually sightable indicia is from the group consisting of signs, symbols, letters, numerals, and colored areas; wherein the indicia includes fluorescent or luminous material visually sightable in the dark; wherein the can top has at least one surface with visually sightable indicia thereon; wherein the at least one surface is a top surface and a bottom surface, each with the indicia thereon; wherein the visually sightable indicia is from the group consisting of signs, symbols, letters, numerals, and colored areas; wherein the indicia includes fluorescent or luminous material visually sightable in the dark; and/or wherein the apparatus is a pipeline valve on a pipeline, the valve for selectively controlling fluid flow in the pipeline.

The present invention, therefore, in at least certain embodiments, but not necessarily all of them, provides a system for indicating a leak of oil from an apparatus, the system including a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can, a can top releasably secured over the open top end of the hollow can, the can top having a hole therethrough, the lid mounted above the can top, and the spring extendable through the hole in the can top, wherein the lid has at least one surface with visually sightable indicia thereon, and wherein the can top has at least one surface with visually sightable indicia thereon.

The present invention, therefore, in at least certain embodiments, but not necessarily all of them, provides a method for indicating a leak of oil from an apparatus, the method including providing a flow conduit for oil leaking from the apparatus to flow to a system for indicating a leak of oil from the apparatus, the system comprising a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can, and launching the lid from the hollow can.

The present invention, therefore, provides in certain, but not necessarily all embodiments, a leak indicating system for a pipeline, for a valve, for any device that may leak fluid, and in certain embodiments for a pipeline valve, the valve for controlling the flow of oil through the pipeline, the leak indicating system having a hollow can with an interior and a top closing off a top of the can and a hole through a can sidewall, a tube or other suitable conduit or pathway in fluid communication with the interior of the can via the hole, leaked fluid from the valve, e.g. from a valve stem packing area, flowable through the tube to the interior of the can, a hollow rod, mounted in the interior of the can, a spring within the rod, initially held in compression, an oil-dissolvable member initially holding the spring in compression thereby preventing it from moving, a secondary lid releasably mounted on and/or to an upper end of the can, and the secondary lid launchable from the top of the can by action of the spring upon dissolution of the oil-dissolvable member.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventor may rely on the Doctrine of Equivalents to determine and assess the scope of the invention and of the claims that follow as they may pertain to apparatus not materially departing from, but outside of, the literal scope of the invention as set forth in the following claims.

What is claimed is:

1. A system for indicating a leak of oil from an apparatus, the system comprising
    a hollow can with a can interior and an open top end, the hollow can in fluid communication with part of the apparatus,
    a lid releasably closing off the open top end of the hollow can, and
    a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can.
2. The system of claim 1 further comprising
    a can top releasably secured over the open top end of the hollow can, the can top having a hole therethrough,
    the lid mounted above the can top, and
    the spring extendable through the hole in the can top.
3. The system of claim 2 further comprising
    a hollow rod encircling the spring and abutting a lower surface of the lid, and
    the oil dissolvable member mounted in the hollow rod and holding the spring in compression.
4. The system of claim 3 further comprising
    a guide tube secured to the can top and encompassing the hollow rod, the hollow rod movable by the spring upwardly within the guide tube against the lid as the lid is launched.
5. The system of claim 4 further comprising
    a bottom member within the hollow rod having an upwardly projecting shaft encircled by a lower end of the spring, the bottom member abutting the oil dissolvable member, and the oil dissolvable member positioned within the hollow rod beneath the bottom member.

6. The system of claim 3 wherein there is at least one opening through the hollow rod whereby the interior of the hollow rod is in fluid communication with the interior of the hollow can so that oil flowing into the can is flowable to contact the oil dissolvable member.

7. The system of claim 4 wherein there is at least one opening through the guide tube whereby the interior of the guide tube is in fluid communication with the interior of the hollow can so that oil flowing into the can is flowable through the at least one opening of the guide tube to the at least one opening of the hollow rod.

8. The system of claim 1 further comprising a collection pan in fluid communication with the can interior for receiving oil from the can interior.

9. The system of claim 8 further comprising a check valve in a conduit providing the fluid communication between the hollow can and the collection pan, the check valve openable in response to a desired pressure of oil within the hollow can.

10. The system of claim 1 wherein the lid has at least one surface with visually sightable indicia thereon.

11. The system of claim 10 wherein the at least one surface is a top surface and a bottom surface, each with the indicia thereon.

12. The system of claim 10 wherein the visually sightable indicia is from the group consisting of signs, symbols, letters, numerals, and colored areas.

13. The system of claim 10 wherein the indicia includes fluorescent or luminous material visually sightable in the dark.

14. The system of claim 2 wherein the can top has at least one surface with visually sightable indicia thereon.

15. The system of claim 14 wherein the at least one surface is a top surface and a bottom surface, each with the indicia thereon.

16. The system of claim 14 wherein the visually sightable indicia is from the group consisting of signs, symbols, letters, numerals, and colored areas.

17. The system of claim 14 wherein the indicia includes fluorescent or luminous material visually sightable in the dark.

18. The system of claim 1 wherein the apparatus is a pipeline valve on a pipeline, the valve for selectively controlling fluid flow in the pipeline.

19. A system for indicating a leak of oil from an apparatus, the system comprising a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can, a can top releasably secured over the open top end of the hollow can, the can top having a hole therethrough, the lid mounted above the can top, and the spring extendable through the hole in the can top, wherein the lid has at least one surface with visually sightable indicia thereon, and wherein the can top has at least one surface with visually sightable indicia thereon.

20. A method for indicating a leak of oil from an apparatus, the method comprising providing a flow conduit for oil leaking from the apparatus to flow to a system for indicating a leak of oil from the apparatus, the system comprising a hollow can with a can interior and an open top end, the hollow can in fluid communication with part of the apparatus, a lid releasably closing off the open top end of the hollow can, and a spring compressed beneath the lid and held in compression by an oil-dissolvable member so that, upon dissolution of the oil dissolvable member by oil leaked from the apparatus and flowing into the hollow can and contacting the oil dissolvable member, the spring is released to launch the lid away from the hollow can, and launching the lid from the hollow can.

* * * * *